No. 767,747.

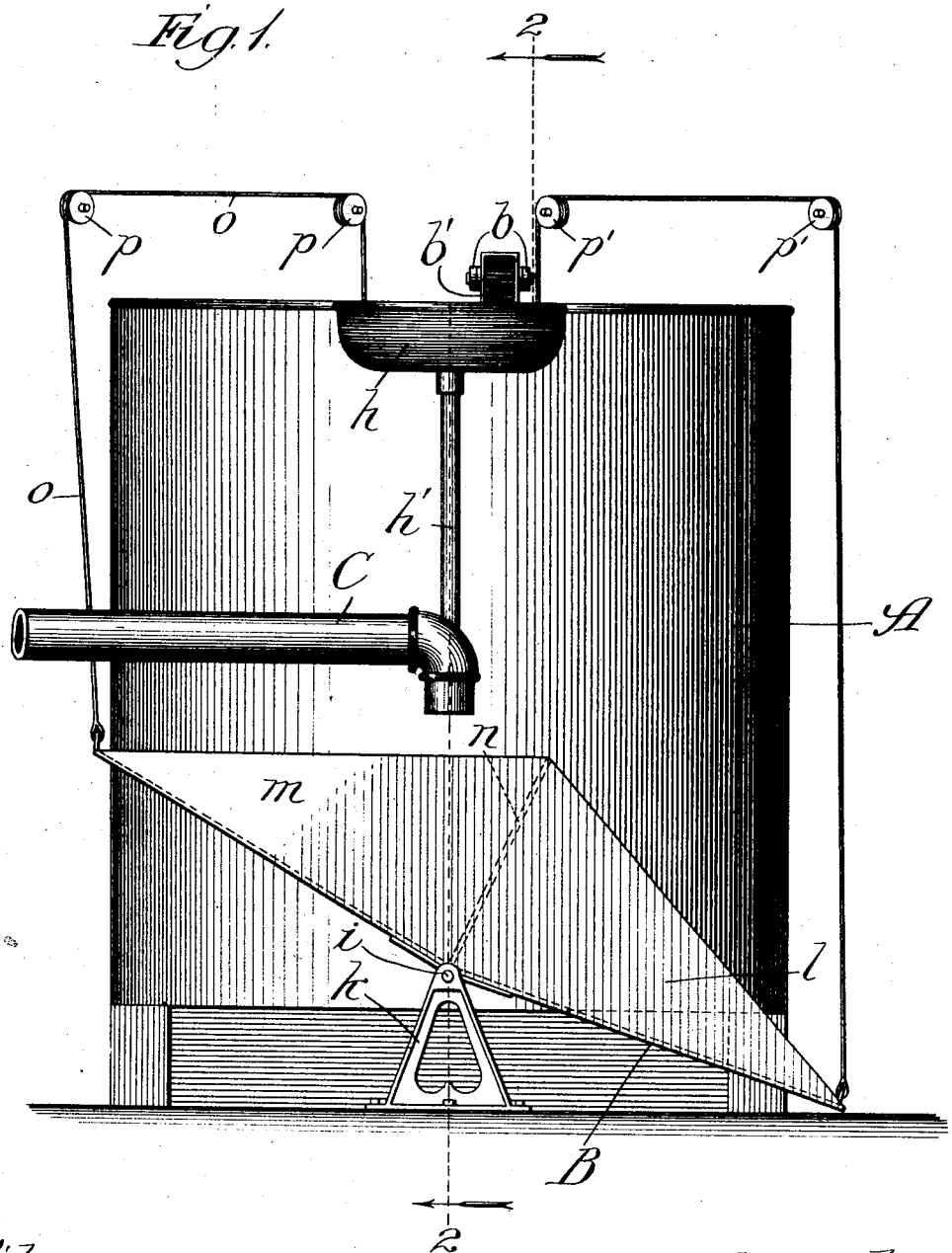

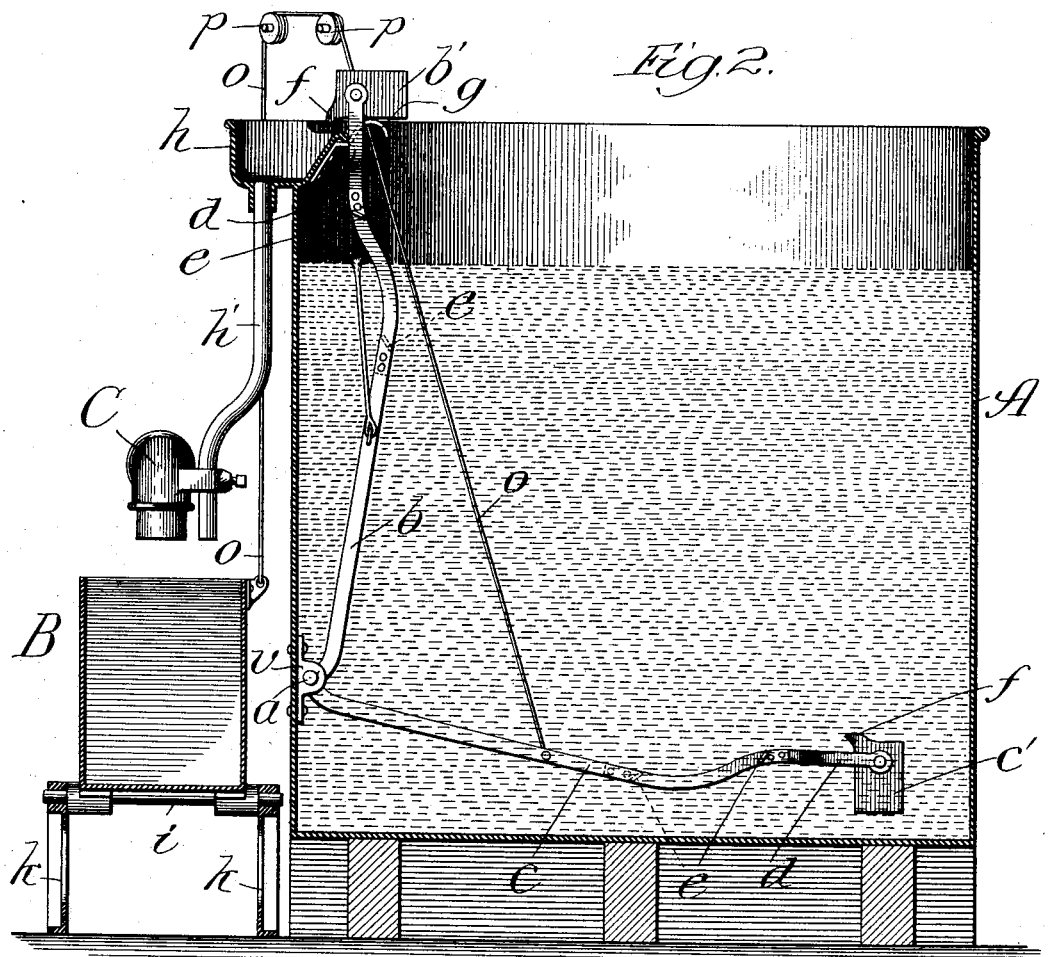
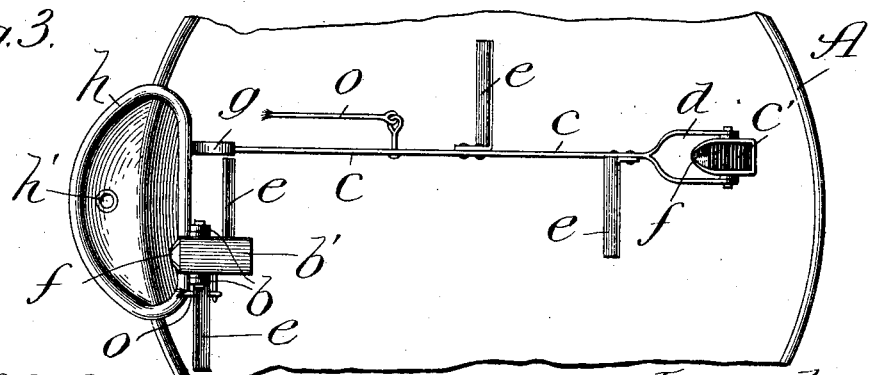

Patented August 16, 1904.

UNITED STATES PATENT OFFICE.

WALTER H. GREEN, OF CHICAGO, ILLINOIS, ASSIGNOR TO KENNICOTT WATER SOFTENER COMPANY, OF CHICAGO, ILLINOIS, A CORPORATION OF ILLINOIS.

WATER-PURIFIER.

SPECIFICATION forming part of Letters Patent No. 767,747, dated August 16, 1904.

Application filed May 9, 1904. Serial No. 207,008. (No model.)

*To all whom it may concern:*

Be it known that I, WALTER H. GREEN, a citizen of the United States, residing at Chicago, in the county of Cook and State of Illinois, have invented a new and useful Improvement in Water-Purifiers, of which the following is a specification.

My invention relates to an improvement in the feature of a water-purifying apparatus for which Letters Patent of the United States No. 732,357 were granted June 30, 1903, to Cass L. Kennicott, involving a rocking receptacle actuated by the flow into it of the water to be purified to dip cups into the tank holding the chemical solution to be mixed in proper proportion with the raw water and raise and discharge their contents into itself for effecting such mixture.

The object of my invention is to provide a novel and materially-simplified construction of this feature of a water-purifying apparatus, such construction being illustrated in the accompanying drawings, in which—

Figure 1 shows my improved device by a view in front elevation. Fig. 2 is a section taken at the line 2 on Fig. 1 and viewed in the direction of the arrow, and Fig. 3 a broken plan view of the solution-tank member of the device.

A is the chemical-solution tank or holder, having rigidly supported in suitable position upon it, as at $v$ in Fig. 2, a shaft $a$, having journaled upon it near its opposite ends arms $b$ and $c$, extending within the tank, each terminating at its outer end in a yoke $d$, in which yokes, respectively, are pivotally hung similar cups $b'$ and $c'$ of suitable capacity for holding the required proportion of the chemical solution. Stirrers are shown in the form of fingers $e$, projecting at intervals from the outer side of each arm, though they do not form an essential part of my improvement. Each cup terminates at its discharge side in a beak-like mouth or spout $f$, at which it engages in the rising motion of the arm carrying it with a stationary trip, shown as a curved finger $g$, projecting from a trough $h$ at the front of the tank A near its upper end, having a discharge-pipe $h'$ leading from it, the purpose of the trip-finger being to turn the cup encountering it and effect the emptying of the contents into the trough.

B is the tilting receptacle, shown in its preferred form of a double-ended scoop supported centrally on a rock-shaft $i$, journaled in suitable bearings $k$ in front of the base of the tank A, the receptacle being divided into two equal sections or chambers $l$ and $m$ by a vertical partition $n$. The arm $c$ is connected with one end of the receptacle B by a rope $o$ or other flexible medium passing over guide-pulleys $p\ p$, and the arm $b$ is connected with the opposite end of the receptacle by a similar medium passing over guide-pulleys $p'\ p'$. The arms $b$ and $c$ thus extend in their extreme relative positions within the tank at or approximately at right angles to each other, though the angle may be varied by journaling the arms higher than shown in the tank.

The raw water to be treated is supplied through a pipe C and flows into the receptacle B, one chamber of which is always presented to the flow. In the illustration, Fig. 1, the chamber $m$ is thus presented, and the weight of the water rocks the receptacle to discharge the contents of that chamber to the precipitating-tank (not shown) of the purifying apparatus, thereby bringing the other chamber, $l$, into the line of flow to be filled from the pipe C and rocked in the contrary direction to discharge its contents. As the receptacle is thus rocked to and fro, it raises one arm, as the arm $b$, by its connection therewith and permits the other arm to sink in the tank A to fill the cup it carries and raise it with the rocking of the receptacle in the opposite direction until the cup is tripped at $g$ and its contents are discharged through the trough $h$ and pipe $h'$ into the receptacle. Thus the automatic rocking of the receptacle alternately raises and empties into it each cup, the arrangement being such that the proper proportion of the chemical solution dipped by a cup from the tank will enter the respective compartment of the receptacle as it begins to fill with the raw water.

It is of course desirable to provide at least two arms in the tank A, each carrying a cup or cups, though it is within my invention to provide only one such arm carrying a cup.

What I claim as new, and desire to secure by Letters Patent, is—

1. The combination with a chemical-solution holder of a water-purifying apparatus, of a tilting receptacle supported to be rocked by the weight of the water to be treated flowing into it, an arm journaled to extend in said holder and pivotally carrying on its free end a cup, tripping means for the cup to cause its contents to discharge near the discharge end of its course, and a flexible connection between said arm and receptacle, whereby the rocking of the receptacle alternately lowers and elevates said arm on its journal to fill and discharge the contents of the cup, substantially as described.

2. The combination with a chemical-solution tank of a water-purifying apparatus, of a tilting receptacle supported to be rocked by the weight of the water to be treated flowing into it, an arm journaled to extend in said holder, having one or more stirrers projecting from it and carrying on its free end a cup, and a flexible connection between said arm and receptacle, whereby the rocking of the receptacle alternately lowers and elevates said arm on its journal to fill and discharge the contents of the cup, substantially as described.

3. The combination with a chemical-solution holder of a water-purifying apparatus, of a tilting receptacle supported to be rocked by the weight of the water to be treated flowing into it, a trough having a discharge-pipe leading to said receptacle, an arm journaled at one end to extend in said holder and having a yoke at its opposite end, a cup pivotally supported in said yoke, a trip in the path of the cup near the discharge end of its course, and a flexible connection between said arm and receptacle, whereby the rocking of the receptacle alternately lowers and elevates said arm on its journal to fill and discharge the contents of the cup, substantially as described.

4. The combination with a chemical-solution holder of a water-purifying apparatus, of a tilting receptacle supported to be rocked by the weight of the water to be treated flowing into it, a pair of arms journaled at one end in said holder to extend in their relatively extreme positions at an angle to each other and each carrying pivotally on its outer end a cup, a trip in the path of each cup near the discharge end of its course, and flexible connections between the arms and the respective ends of the receptacle, whereby the rocking of the receptacle in each direction lowers one arm in said holder while raising the other therein, substantially as and for the purpose set forth.

5. The combination with a chemical-solution holder of a water-purifying apparatus, of a tilting receptacle supported to be rocked by the weight of the water to be treated flowing into it, a trough having a discharge-pipe leading to said receptacle, a pair of arms journaled at one end in said holder to extend in their relatively extreme positions at an angle to each other and each terminating at its free end in a yoke, cups pivotally supported in said yokes, a trip in the path of each cup near the discharge end of its course, and flexible connections between the arms and the respective ends of the receptacle, whereby the rocking of the receptacle in each direction lowers one arm in said holder while raising the other therein, substantially as and for the purpose set forth.

6. The combination with a chemical-solution holder of a water-purifying apparatus, of a tilting receptacle supported to be rocked by the weight of the water to be treated flowing into it, a trough having a discharge-pipe leading to said receptacle, a pair of arms journaled on a shaft in said holder to extend in their relatively extreme positions at an angle to each other and each terminating at its free end in a yoke, cups pivotally supported in said yokes, stirrers projecting from said arms, tripping-fingers on the trough in the paths of the cups, flexible connections between the arms and the respective ends of the receptacle, and guide-pulleys for said connections, the whole being constructed and arranged to operate substantially as described.

WALTER H. GREEN.

In presence of—
L. HEISLAR,
WALTER N. WINBERG.